United States Patent [19]

Pruessel

[11] Patent Number: 5,834,658
[45] Date of Patent: Nov. 10, 1998

[54] METHOD FOR MONITORING THE PATH OF MOVEMENT OF A PART

[75] Inventor: Holger Pruessel, Buehlertal, Germany

[73] Assignee: Bosch GmbH, Stuttgart, Germany

[21] Appl. No.: 860,412

[22] PCT Filed: Oct. 22, 1996

[86] PCT No.: PCT/DE96/02005

§ 371 Date: Jun. 24, 1997

§ 102(e) Date: Jun. 24, 1997

[87] PCT Pub. No.: WO97/15872

PCT Pub. Date: May 1, 1997

[30]  Foreign Application Priority Data

Oct. 25, 1995 [DE] Germany ............... 195 39 577.8

[51] Int. Cl.⁶ .................................................. G05B 11/14
[52] U.S. Cl. ............................................ 73/865.9; 318/626
[58] Field of Search ............................. 73/865.9; 318/3, 318/9, 799, 806, 830, 626, 616

[56]  References Cited

U.S. PATENT DOCUMENTS 5,278,480  1/1994  Murray ..................................... 318/286

FOREIGN PATENT DOCUMENTS 3034118  3/1982  Germany.

*Primary Examiner*—Robert Raevis
*Attorney, Agent, or Firm*—Spencer & Frank

[57]  ABSTRACT

A method for monitoring the path of movement of a part which is movable toward at least one end position by means of a drive, wherein at least one time period is measured which corresponds to a selectable number of revolutions of a drive shaft and the at least one time period is evaluated and supplies a measure for a running behavior of the part. Immediately after the start of the drive, at least one time period is measured which corresponds to a selectable number of revolutions of the drive shaft, this time period is stored temporarily when the drive shaft has executed a selectable minimum number of revolutions and, during a next start of the drive, the time period corresponding to the selectable number of revolutions of the drive shaft is measured again and is compared with the temporarily stored time period and the drive is stopped or reversed if the temporarily stored time period is exceeded by a selectable measure.

7 Claims, 1 Drawing Sheet

METHOD FOR MONITORING THE PATH OF MOVEMENT OF A PART

The invention relates to a method for monitoring the path of movement of a part which can be moved toward at least one end position by means of a drive, wherein at least one time period is measured which corresponds to a selectable number of revolutions of a drive shaft and the at least one time period is evaluated and supplies a measure for a running behavior of the part.

PRIOR ART

It is known to combine parts with a drive which moves the parts along a path of movement. In this process, the parts can be moved toward at least one end position, in particular, they can be moved back or forth between two end positions. Parts which are movable in such a way are used, for example, in motor vehicles as electrical window lifters or electrically operable sliding roofs. By means of a switching means, the window lifters or the sliding roof can be put into motion via the drive, so that they are moved automatically toward their end position, that is, into their closed position. This involves the risk that a body part of a vehicle occupant gets into the path of movement of an automatically closing window or sliding roof, thus entailing a considerable risk of injury.

It is known to equip parts that are moved in this manner to exhibit a closing force limitation by means of a device, wherein a counterforce exerted on the moved part is determined indirectly and the drive is stopped or reversed as a function of the indirectly determined counterforce. For this purpose, for example, a time period is measured which corresponds to a selectable number of revolutions of a drive shaft of the drive, and if, in the presence of the same number of revolutions of the drive shaft, the time period becomes longer, it is inferred that there is a risk of an object or body part getting caught. Such a procedure is known, for example, from DE 30 34 118 C2.

But the disadvantage of the known methods is that a time measurement takes place only at a moment which is offset in time after the start of the drive in order to take account of a compensation for play of the mechanical parts of the drive. But since during the starting phase, in which the compensation for play takes place, the part, here the window, already traverses a specific amount of its path of movement, which may, for example, amount to several cm, it becomes possible to close the window by means of a clocked operation of the switching means without activating the protection against an object or body part getting caught.

SUMMARY AND ADVANTAGES OF THE INVENTION

In contrast, the method according to the invention offers the advantage that the protection against an object or body part getting caught remains intact over the entire path of movement of the part, even in the presence of a clocked operation of the switching means and therewith a clocked setting into operation of the drive. Immediately after the start of the drive, at least one time period is measured, which corresponds to a selectable number of revolutions of the drive shaft; and this time period is stored temporarily after the drive shaft has gone through a further selectable minimum number of revolutions; and, during a next start of the drive, the time period corresponding to the selectable number of revolutions of the drive shaft is measured again and is compared with the temporarily stored time period; and the drive is stopped or reversed if the temporarily stored time period is exceeded by a selectable measure. Therefore, it is possible in an advantageous manner to realize a monitoring and thus an evaluation of the path of movement of the part immediately when the drive is set into operation. Thus, the startup phase of the drive and the associated compensation for play of the force transmission mechanics exerted on the part to be moved do not have to be considered, because two starting processes that immediately follow one another are compared with one another and thus the startup behavior which is identical in the two starting processes can be masked.

Advantageous embodiments of the invention result from the further described characteristics and modifications.

BRIEF DESCRIPTION OF THE DRAWINGS

In the following, the invention is explained in greater detail in an embodiment by way of the associated drawings, wherein.

DETAILED DESCRIPTION OF THE PREFERRED EMBODIMENT

Figure 1:
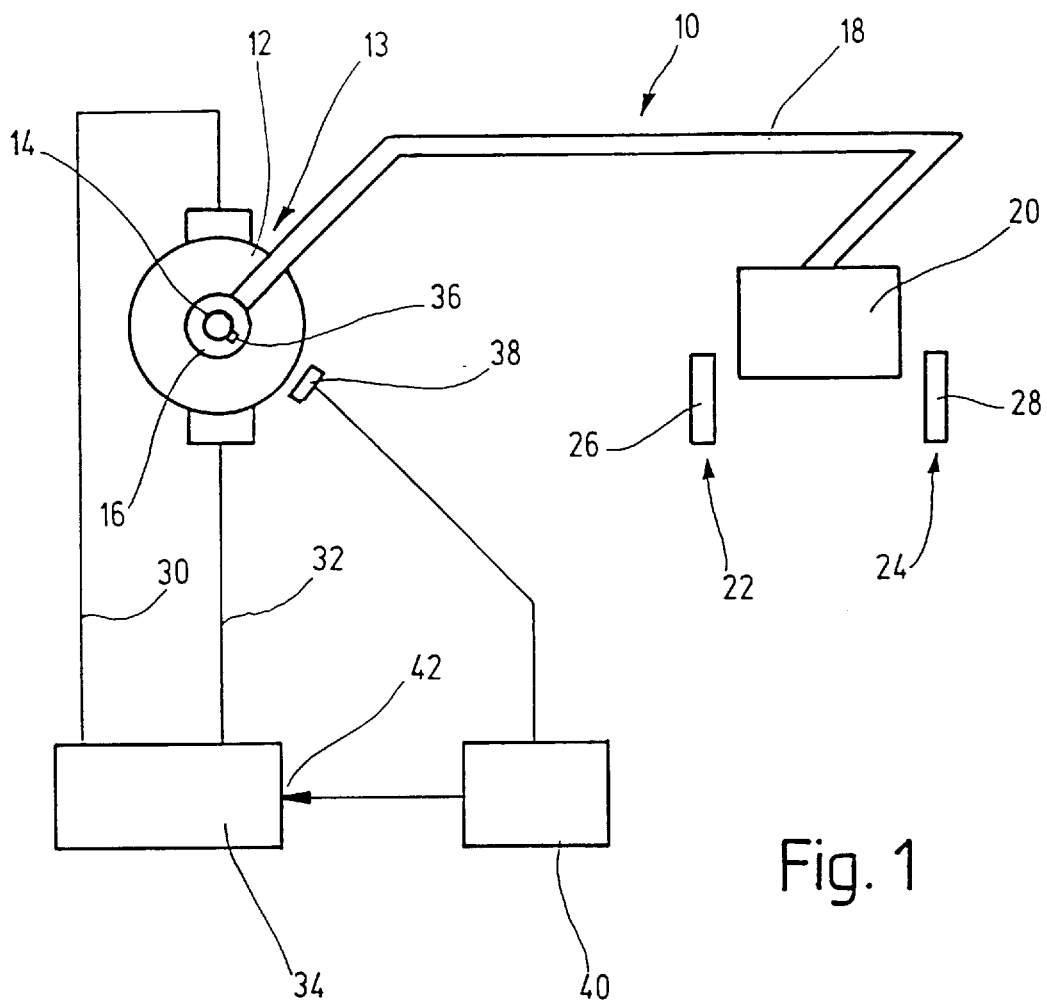
FIG. 1 schematically, shows an arrangement for implementing the method according to the invention.

FIG. 1 schematically shows a drive system for the positioning of a part, identified in general by 10. The drive system 10 has a drive 13 which is configured as an electric motor 12. A drive shaft 14 of the electric motor 12 engages a gearing 16 which is only indicated here. Via a transmitting device 18, the gearing 16 is connected to a part 20 to be positioned. The part 20 can be moved back and forth by means of the drive 13 between a first end position 22 and a second end position 24, formed by limit stops 26 or 28, respectively. The electric motor 12 is connected via motor connection lines 30 or 32 with a control circuit 34. The drive shaft 14 of the electric motor 12 supports at least one signal generator 36 whose signals can be picked up by a sensor 38. The sensor 38 is connected to an evaluation circuit 40. The evaluation circuit 40 is connected with an input 42 of the control circuit 34.

The drive system 10 illustrated in FIG. 1 can be used, for example, for the adjustment of electrical window lifters in motor vehicles. But this is only one example of the applications that are possible. Thus, it is possible, of course, to use the drive system 10 for all further applications in which a part is movable between two end positions. These applications are not limited to equipment options in motor vehicles.

The drive system 10 illustrated in FIG. 1 has the following function, with it being assumed here that the system relates to a drive system for window lifters in motor vehicles.

After the operation of a switching means, not shown, the electric motor 12 is set into operation via the control circuit 34. In this process, the gearing 16 is engaged via the rotating drive shaft 14 so that the transmitting device 18 and the part 20 move toward one of the limit stops 26 or 28 in a known manner. First, together with the setting into operation of the electric motor 12, a compensation for play of the mechanical components of the drive system 10 takes place, in the illustrated example the engagement of the drive shaft 14 into the gearing 16, as well as the transmission of the rotational movement to the transmitting device 18. The further text assumes that limit stop 26 is the lower stop of the window lifter and, correspondingly, limit stop 28 the upper stop.

With each revolution of the drive shaft 14, a signal is transmitted via the at least one signal generator 36 to the sensor 38 which forwards the signal to the evaluation circuit 40. The path of movement of the part 20 can be simulated in the evaluation circuit 40 by means of a corresponding electronic circuit via the time period between directly successive pulses of the signal generator 36 or via the time period between a selectable number n of pulses of the signal generator 36, with each pulse, for example, corresponding to a full revolution of the drive shaft 14.

Figure 2:
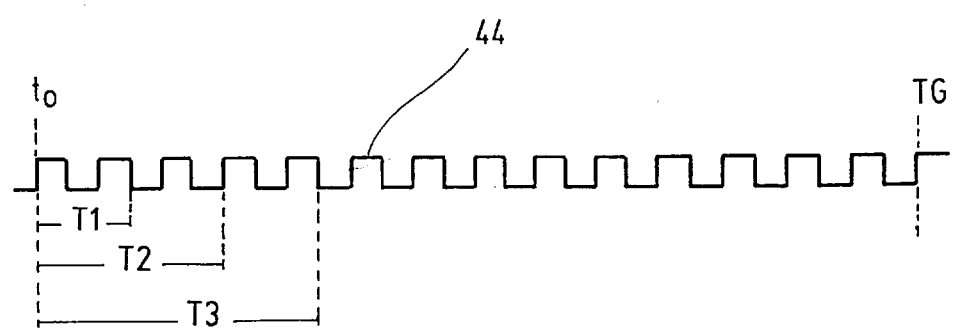
FIG. 2 is a time diagram of a starting process.

In a diagram, FIG. 2 illustrates the plotting of a pulse sequence of the sensor 38 by way of example. With each start of the electric motor 12 at a moment t0, a pulse 44 is made available by the signal generator 36 via the sensor 38 with each revolution of the drive shaft 14. The pulses 44 are counted by means of the evaluation circuit 40. In this process, an algorithm is prescribed for the evaluation circuit 40, which algorithm, for example, can be selectably adjusted in a memory unit, not shown. This algorithm has the effect that, respectively after a specific number of pulses, a time period T is measured and stored. Thus, for example, after two pulses 44, that is, after two revolutions of the drive shaft 14, a first time T1 can be picked-up, after 3.5 revolutions of the drive shaft 14 (for this purpose the drive shaft 14 has more than one signal generator 36 distributed over its circumference) a time T2 and after five revolutions of the drive shaft 14 a time T3. These times T1, T2 and T3 are stored temporarily in a memory means for the event when the drive shaft 14 executes a predeterminable minimum number of revolutions, that is, when a predeterminable minimum number of pulses 44 are picked up. During the pickup of the time periods T1, T2 and T3 immediately after the starting moment T0, an initial compensation for play of the mechanical parts—which was already explained—is also considered to the extent that the parts have an effect on the revolution of the drive shaft 14. Once the drive shaft 14 has generated the predetermined minimum number of pulses 44, the time periods T1, T2 and T3 are stored temporarily as reference times within the evaluation circuit 14. The minimum number of the pulses 44 is present at a time period TG. Since the electric motor 12 as well as the voltage supply of the electric motor 12 are known per se, the theoretical number of pulses 44 within a specific, selectable time period can be calculated in advance. Based on this time period between two successive pulses 44, which is to be expected in theory, the evaluation circuit 40 recognizes whether there is a tendency that an object or a body part can get caught between the moving part 20 and the upper limit stop 28 when the electric motor 12 stops. If there were an event where an object or body part is getting caught, a counterforce would be exerted on the moving part 20, thus leading to a deceleration of the number of revolutions of the electric motor 12, so that the time interval between successive pulses 44 increases.

If the evaluation circuit 40 recognizes an event where an object or body part is getting caught, the time periods T1, T2 and T3 are measured again for the respective same number of pulses 44 during the subsequent switching on of the electric motor 12 and they are compared with the temporarily stored reference values for the time periods T1, T2 and T3 on the basis of the previous measurement. If the newly measured time periods T1, T2 and T3 exceed the reference times, the actuating circuit 40 recognizes an event where an object or body part is getting caught, whereupon a corresponding signal is emitted to the control circuit 34 and the electric motor 12 is stopped or reversed, that is, rotated in the reverse direction. This ensures a continuous protection for the moving part 20 against an object or body part getting caught, which protection is activated directly with the switching on of the electric motor 12, that is, without consideration of a possible compensation for play.

The number of time periods T, which are measured and stored temporarily as reference times, can be selected freely and may, for example, be between 1 and n. The number of the pulses 44 for which one or several time periods T are picked up is also selectable. The minimum number of pulses 44 and thus of the total time period TG, which must pass before the previously measured time periods T are stored as reference times, can also be selected. The corresponding number of pulses 44 or of the time periods T can be entered or predetermined separately for each specific application by means of the evaluation circuit 40.

By predetermining a minimum number of pulses 44 or the minimum time period TG associated therewith, it is ensured that in case that with the first start of the electric motor 12 an event is present where an object or body part is getting caught, the measured time periods T1, T2 and T3 cannot be picked up as reference values and be stored temporarily.

I claim:

1. A method for monitoring the path of movement of a part which is movable toward at least one end position by means of a drive, wherein at least one time period is measured which corresponds to a selectable number of revolutions of a drive shaft and the at least one time period is evaluated and supplies a measure for a running behavior of the part, characterized in that, immediately after the start of the drive, at least one time period is measured which corresponds to a first selectable number of revolutions of the drive shaft, this at least one time period is stored temporarily after the drive shaft has executed a further selectable minimum number of revolutions greater that said first selectable number of revolutions and, during a next start of the drive, the time period corresponding to the first selectable number of revolutions of the drive shaft is measured again and is compared with the temporarily stored time period and the drive is stopped or reversed if the temporarily stored time period is exceeded by a selectable measure.

2. A method according to claim 1, wherein three of said time periods each corresponding to a different first selectable number of revolutions are measured, with each time period corresponding to a number of pulses respectively supplied by the drive.

3. A method according to claim 2, wherein the pulses are generated by at least one signal generator that rotates with the drive shaft.

4. A method according to claim 2, wherein an evaluation circuit receiving the pulses determines the time periods, stores them temporarily and compares them with the stored time periods of the preceding starting process for the drive.

5. A method according to claim 2, wherein the drive is stopped or reversed if the time periods measured during a follow-up start of the drive exceed the temporarily stored time periods by a selectable measure and if during the stop of the drive immediately prior to the follow-up start a risk of an object or body part getting caught is recognized.

6. A method according to claim 5, wherein the risk of an object or body part getting caught is recognized by an evaluation of the pulses during the operation of the drive.

7. A method according to claim 1 wherein the time periods correspond to a given number of pulses supplied by the drive.

* * * * *